(No Model.)
J. J. HALEY.
RUBBER HANDLE.
No. 264,527. Patented Sept. 19, 1882.
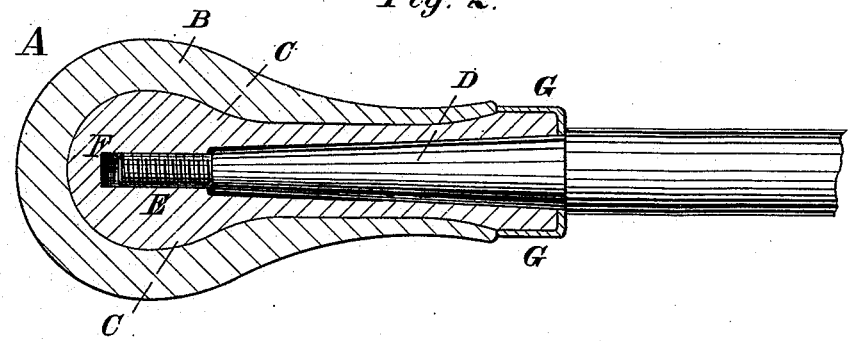
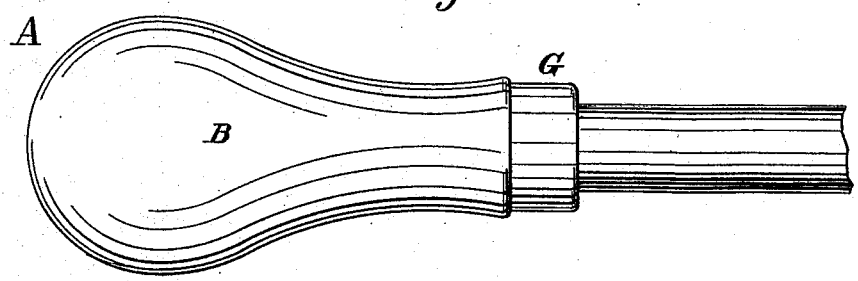
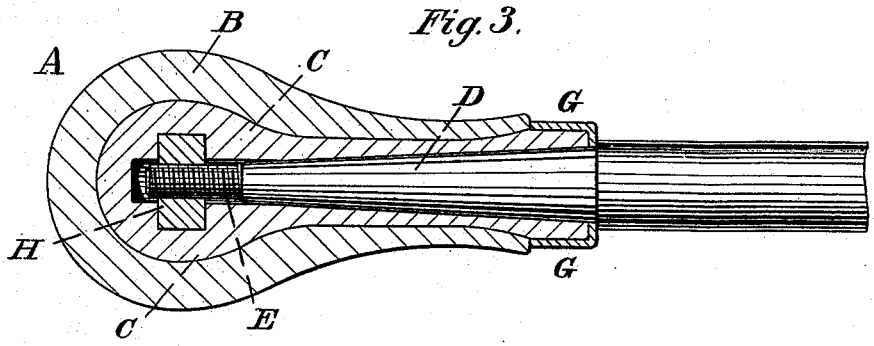
WITNESSES:
J. Converse Gray
F. G. Whiston
INVENTOR:
John J. Haley.
by Elmer P. Howe,
atty.

UNITED STATES PATENT OFFICE.

JOHN J. HALEY, OF NEWTON, MASSACHUSETTS.

RUBBER HANDLE.

SPECIFICATION forming part of Letters Patent No. 264,527, dated September 19, 1882.

Application filed June 2, 1882. (No model.)

*To all whom it may concern:*

Be it known that I, JOHN J. HALEY, of Newton, in the county of Middlesex and State of Massachusetts, have invented certain new and useful Improvements in India-Rubber Handles, of which the following is a specification.

My invention is applicable to all classes of handles in which elasticity is desirable; but it is especially designed for and is here described and represented as applied to one of the tiller-handles of a bicycle or velocipede.

My invention consists in a handle composed of two layers or strata of vulcanized india-rubber, the inner, which is in contact with the tang or shank to which it is applied, being formed of what is technically known as "semi-hard" rubber, or of rubber hard enough to hold a screw-thread, while the outer, which is to be grasped by the hand of the user, is formed of ordinary elastic india-rubber. The handle is molded and vulcanized in the ordinary way around a core identical in form and dimensions with the tang or shank to which it is to be applied, and which also has a screw-thread cut near its end. When the core is withdrawn from the vulcanized handle a hole will be left running longitudinally in the handle and terminating in the interior thereof in a female screw formed in the hard rubber. It is obvious that the handle may be molded and vulcanized upon the tang or shank of the article on which it is to be used without the use of a core.

In the accompanying drawings, Figure 1 is an elevation of one end of a bicycle-tiller with my improved handle attached. Fig. 2 is a longitudinal section of a handle, the end of the tiller being shown in elevation. Fig. 3 is a longitudinal section, showing a nut inserted in the interior of the handle.

Similar letters of reference indicate like parts.

In Figs. 1 and 2 of the drawings, A represents a handle composed of an elastic rubber exterior, B, and a hard or semi-hard rubber interior, C. D is the tang or shank of a bicycle-tiller, which is reduced in size at its extremity, and has a screw-thread, E, cut thereon, adapted to work in a female screw, F, formed in the hard rubber of the handle. The opening left in the handle is similar in form and dimensions to the shank of the tiller, so that when the handle is applied to the tiller the end of the screw-thread F, formed in the rubber, is drawn onto the threaded end E of the tiller, the interior surface of the handle is brought into close contact with the exterior surface of the shank of the tiller and is securely held thereon. A ferrule, G, may be applied, as upon a wooden handle.

In Fig. 3 of the drawings a handle of identical construction is shown, having a nut, H, of metal or suitably-hard material, molded and vulcanized into the interior layer of the handle. The nut H receives the threaded end of the tang or shank to which the handle is applied, and offers a greater resistance to the withdrawal of the handle than does the thread formed in the hard rubber itself.

I am aware that handles have been made of elastic rubber and of hard rubber, each used alone, and of elastic rubber with metallic or other rigid cores; but by the combination of elastic and semi-hard vulcanized rubber, as herein described, I am enabled to construct a handle slightly yielding throughout its mass, so that it will distribute the jar of a sudden blow nearly as well as a handle made entirely of elastic rubber, yet firm enough in its interior to be held properly upon the shank to which it is to be applied, which will present a soft elastic surface, and yet will offer the desired resistance to the grasp of the hand of the user.

I claim—

1. A handle composed of an exterior layer of elastic vulcanized rubber and an interior layer of semi-hard vulcanized rubber, and provided with a hole in its interior layer similar in form and dimensions to the tang or shank to which it is to be applied, substantially as described and shown.

2. A handle composed of an exterior layer of elastic vulcanized rubber and an interior layer of semi-hard vulcanized rubber, provided with a hole in its interior layer similar in form and dimensions to the tang or shank to which it is to be applied, and having a screw-thread, F, formed on its interior surface, substantially as and for the purpose described.

3. In a handle composed of an exterior layer of elastic vulcanized rubber and an interior layer of hard vulcanized rubber, and provided with a hole in its interior layer similar in form and dimensions to the tang or shank to which it is to be applied, a nut, H, of metal or suitably-hard material molded and vulcanized therein, as and for the purpose described.

JOHN J. HALEY.

Witnesses:
 ELMER P. HOWE,
 W. H. GLEASON.